(12) United States Patent
Davidson

(10) Patent No.: US 11,971,328 B2
(45) Date of Patent: *Apr. 30, 2024

(54) SYSTEMS, DEVICES, AND METHODS FOR DETECTING AND CONTROLLING LEAKS OF LIQUIDS OR GASES

(71) Applicant: Avraham Davidson, Netanya (IL)

(72) Inventor: Avraham Davidson, Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/584,570

(22) Filed: Jan. 26, 2022

(65) Prior Publication Data

US 2022/0146363 A1 May 12, 2022

Related U.S. Application Data

(63) Continuation-in-part of application No. 16/817,067, filed on Mar. 12, 2020, now Pat. No. 11,262,269.

(60) Provisional application No. 62/820,012, filed on Mar. 18, 2019.

(51) Int. Cl.
*G01M 3/28* (2006.01)
*F17D 5/00* (2006.01)
*G01M 3/18* (2006.01)

(52) U.S. Cl.
CPC ........ *G01M 3/2815* (2013.01); *G01M 3/2876* (2013.01); *G01M 3/184* (2013.01)

(58) Field of Classification Search
CPC .......... G01M 3/00; G01M 3/18; G01M 3/184; G01M 3/26; G01M 3/28; G01M 3/2815; G01M 3/2876; F17D 5/00
See application file for complete search history.

(56) References Cited

U.S. PATENT DOCUMENTS

| 4,043,355 A * | 8/1977 | Cerruti ............... G01M 3/2876 137/557 |
| 10,648,842 B2 * | 5/2020 | Croteau .................. F16K 17/36 |
| 10,732,068 B2 | 8/2020 | Jestice et al. |
| 11,262,269 B2 * | 3/2022 | Davidson ............ G01M 3/2807 |
| 11,299,871 B2 * | 4/2022 | Bailey ................. G01M 3/2815 |

(Continued)

FOREIGN PATENT DOCUMENTS

| CN | 108414164 A * | 8/2018 | .......... G01M 3/2807 |
| WO | 2014/203246 A2 | 12/2014 | |
| WO | 2017/053978 A1 | 3/2017 | |

*Primary Examiner* — Nguyen Q. Ha
(74) *Attorney, Agent, or Firm* — Edell, Shapiro & Finnan, LLC

(57) ABSTRACT

Described herein are systems, devices, and methods for detecting leaks or blockages of liquids or gases in a transporting network. In various embodiments, either a flow or a pressure detector is attached to the network, changes are sensed over time, and data about flow or pressure is sent to and from a controller. In alternative embodiments, static and dynamic states are identified to discover relatively small leaks or blockages, sometimes by emptying the network in whole or in part. In some embodiments, aggregate measurement data is processed to identify usage and performance features particular to the transporting network, which allows a continuous improvement in the measurement of leaks and flow direction. In some embodiments, one detector can measure changes in multiple paths of the transporting network. In some embodiments, corrective action is taken automatically, while in other embodiments human operators order corrective action.

16 Claims, 10 Drawing Sheets

(56) References Cited

U.S. PATENT DOCUMENTS

| | | |
|---|---|---|
| 2008/0266125 A1 | 10/2008 | Windisch et al. |
| 2012/0024393 A1 | 2/2012 | Menet |
| 2018/0230681 A1 | 8/2018 | Poojary et al. |
| 2018/0238765 A1 | 8/2018 | Gramespacher |
| 2018/0291594 A1 | 10/2018 | Hammond et al. |
| 2020/0264068 A1 | 8/2020 | Mess et al. |
| 2023/0044861 A1* | 2/2023 | Randy ................. E03B 7/07 |

* cited by examiner

SYSTEMS, DEVICES, AND METHODS FOR DETECTING AND CONTROLLING LEAKS OF LIQUIDS OR GASES

CLAIM OF PRIORITY

This document claims priority to U.S. Ser. No. 16/817,067, filed Mar. 12, 2020, which claims priority to U.S. Provisional Patent Application No. 62/820,012, filed Mar. 18, 2019. The entire disclosure of each of the applications listed in this paragraph is hereby incorporated herein.

BACKGROUND

We are used to thinking that a network that contains or transports liquid or gas will preserve its content, and that whatever enters the network leaves it without a loss. In reality, however, leakage is very common, as a result of a foreseen or unforeseen problem or fault in the network.

A leak from a network transporting liquid or gas may result in multiple types of damage, such as:
  The cost of the lost liquid/gas.
  Damage to the environment as a result of the leak.
  Danger in the cases where the leak is a dangerous substance.

Often a leak occurs when the leak site is not accessible, or when people are not on site. Sometimes the leak is at the network's entrance as a result of pressure differences between the transporting network being checked and the feed into such network.

Most leaks start as drips. But if a small problem is not resolved early on, sooner or later the small problem grows. The growing problem can lead to
  (1) Economic damage that becomes greater with time; and/or
  (2) Physical damage to people or animals.

Early detection of a drip or other small leak is vital to prevent physical damage to person and property. Leakage should be detected even at a relatively early stage, and even if people are not on site.

Various solutions exist in the prior art for detecting leaks. Large leaks in particular are usually detected by one or more of:
  Acoustic changes between the flow during a leak, and a normal or stable flow.
  Physical stain. There are detectors that detect the content of the system outside of the system, even in small quantities.
  Flood. There are detectors that detect the accumulation of liquids outside of the system, such as, for example, a puddle of water or even minor dampness.
  Pressure. Leaks often cause a change in the pressure of the flow of liquid or case.
  A change in the entrance of liquid or gas into a transporting network,
  A change in the volume of liquid/gas over time.

None of these prior art solutions are entirely successful. They all have problems, such as:
  Problems detecting relatively small leaks in the transport system, say on the order of about 1% of flow or less. For example, acoustic or electromechanical detectors are good for detecting major leaks, but not small flow changes.
  Problems detecting the direction of flow at any one time, although changes in flow direction are often indicative of a leak or other problem in the transport system.
  Problems detecting a minor standard deviation in flow. The flow and volume of liquid or gas in a transport system is not fixed, so changes do occur, and prior art detectors have difficulty detecting small problems in real-time. It is almost impossible to find the difference between a leak and a change in the flow due to normal operation.
  Problems of statistics tools in measuring the rate of flow or throughput over a long period (day, month) and finding differences in flow or throughput. Statistics tools take a long time to detect small changes, and are in addition inaccurate as to such changes.

There are some measurement systems in the prior art that work by directly measuring small changes in flow. That is, two or more sensors will be placed at different points in a transporting network, and measurements are made between sensors. Thus, if the flow changes from one point to another, leak may be inferred. Although these measurement systems may work if the sensors are sufficiently sensitive, the systems are relatively complicated and expensive, since they require multiple points of measurement to determine a single leak.

What is required is a simpler system that requires less hardware, and relies more upon intimate knowledge of the transporting network and statistical analysis to infer leakage or other problems of flow within the transporting network.

Another problem in the current art, related to but distinct from the problem of measuring flow of gas or liquid in a transporting network, is the measurement of gas or liquid pressure in the network, and changes in such pressure resulting from leaks or blockages in the network. The solutions outlined above are inadequate for measuring such pressure.

Another problem in the current art is an inability to determine where in the transporting network a problem has occurred, either leakage or blockage. There is a need to pinpoint the location of such problems, but without adding masses of sensors to the network.

SUMMARY

Described herein are systems, devices, and methods for detecting leaks, or blockages, of liquids or gases in a system that transports such liquids or gases.

Presented are systems, devices, and methods for detecting a very small leak in a system or enclosure containing gas or liquid, even as early as from a dripping stage in various embodiments. Presented also are systems, devices, and methods for detecting the direction of the flow of gas or liquid in a pipe or other transporting network.

Many types of leaks and direction flows may be detected. Some non-limiting examples for liquids include water, oil, and gasoline. Some non-limiting examples for gases includes cooking gas, natural gas, oxygen, carbon monoxide, and carbon dioxide.

Among the many potential benefits of various embodiments are reduction of lost resources, identification of the nature or location of a problem, and early warning of a hazardous condition.

One embodiment is a system for measuring and controlling leakage in a transporting network containing a liquid or a gas. The transporting network is a series of pipes or other guides for directing a flow of liquid or gas, or a storage network for liquid or gas. The measuring system includes a flow detector for measuring the rate of flow of liquid or gas. In some embodiments, the detector may also measure the direction of flow within the transporting network, which may change over time. The measuring system includes also a controller for receiving data from the flow detector, and processing the data into information to determine if there is a leak in the transporting network. If there is a leak, the controller can determine through processing the rate of leakage in terms of flow over time. In some embodiments, action may be taken either automatically or by human intervention to stop a leak. In some embodiments, data from the flow detector is compared against a database of information that indicates typical or expected flow in the transporting network over time.

One embodiment is a method for detecting flow leakages in a transporting network. A measurement and control system is provisioned by a flow detector measuring rate of flow and direction of flow of liquid or gas in a transporting network. The detector makes multiple measurements at multiple times during a specified time range to provide data to determine a static state of the transporting network with no flow, and to determine multiple dynamic states of the transporting network with variable flow and variable direction in different time periods and according to different conditions. At some time after provisioning, the detector measures a first flow and first direction in the transporting network and a controller compares the flow and direction to the measures the static and dynamic states to determine if there is any real leakage at all in the transporting network. If there is determined to be any leakage, the measurement and control system continues with multiple measures of a second flow and a second direction, and then process the data to determine if the rate of leakage is beyond a specific minimum rate. If the rate of leakage is beyond the specific minimum rate, the measurement and control system continues with multiple measures of a third flow and a third direction to determine if the rate of leakage is beyond a certain maximum rate. If the rate of leakage determined in the third flow is not beyond the maximum rate, the rate of leakage to a communication unit, but if the rate of leakage in the third flow is beyond the specific maximum rate, in some embodiments the flow in the transport system is terminated.

One embodiment is a method for a measurement and control system to learn the rate of flow and direction of liquid or gas in a transporting network. In one embodiment, a valve is closed to stop the flow of liquid or gas into the transporting network. While the valve is closed, there is no input flow into the network. The measurement and control system then waits for a brief time for the transporting network to empty of the liquid or gas, typically up to a few seconds although the interval may be variable. The valve is then opened, liquid or gas rushes quickly into the transporting network, and a detector immediately measures the rate of flow and direction of flow of liquid or gas in the transporting network, such flow determined at a physical point of measurement. Data about flow is sent to a controller, which processes such data to determine when the transporting network is likely to be static without flow, and when the transporting network is likely to be dynamic with flow and direction. In dynamic states, expected rates of flow are also determine. In some embodiments, the valve is specifically an electrical valve which may be activated automatically or rather by a person. In other embodiments, the valve is a mechanical valve operated by a person.

In various embodiments, the measuring of rate of flow and direction flow are used to determine whether or not there is a leak, if so what is the current seriousness of the leak by volume over time, what is the change in the volume of the leak over time, and what is the direction of the flow of the gas or liquid at a particular point in time. In some embodiments, it is possible to identify the specific cause of a leak, or at least one likely cause of a leak. In some embodiments, a flow of air is introduced into to the transporting network to aid in the emptying of the transporting network.

One embodiment is a system for measuring and controlling leakage or blockage in a transporting network containing a liquid or a gas. The transporting network is a series of pipes, valves, or other guides for directing a flow of liquid or gas, or a storage network for liquid or gas. The measuring system includes a flow detector for measuring the rate of flow of liquid or gas at a point of measurement. In some embodiments, the detector may also measure the direction of flow within the transporting network, which may change over time. The system includes a flow input value, and the flow detector is positioned immediately upstream from the flow detector. The measuring system includes also a controller for receiving data from the flow detector, and processing the data into information to determine if there is a leak in the transporting network. If there is a leak, the controller can determine through processing the rate of leakage in terms of flow over time, or the severity of the blockage. In some embodiments, action may be taken either automatically or by human intervention to stop a leak or respond to the blockage. In some embodiments, data from the flow detector is compared against a database of information that indicates typical or expected flow in the transporting network over time.

One embodiment is a system for measuring and controlling leakage or blockage in a transporting network containing a liquid or a gas. The transporting network is a series of pipes or other guides for directing a flow of liquid or gas, or a storage network for liquid or gas. The measuring system includes a pressure detector for measuring the liquid or gas pressure in the network at a point of measurement. In some embodiments, the detector may also measure the direction of flow within the transporting network, which may change over time. The measuring system includes also a controller for receiving data from the pressure detector, and processing the data into information to determine if there is a leak or blockage in the transporting network. If there is a leak or blockage, the controller can determine through processing the rate of leakage in terms of flow over time, or the severity of the blockage. In some embodiments, action may be taken either automatically or by human intervention to stop a leak, or respond to the blockage. In some embodiments, data from the pressure detector is compared against a database of information that indicates typical or expected pressure in the transporting network over time.

One embodiment is a method for a measurement and control system to learn the pressure of liquid or gas in a transporting network. In one embodiment, the system is provisioned by the placement of sensors, processors and communication at points in the transporting network, and the preparation of algorithms to detect patterns of flow over time. A flow detector measures the flow in the system at a point of measurement, and in some embodiments measures the changes in flow over time at that point in the network. Data from the flow detector is communicated to a processor, which determines, based on the data, the pressure at the point of measurement. The results of multiple measurements of pressure are communicated to a data processor which uses the data to calculate patterns of pressure over time at the point of measurement. In some embodiments, these patterns of pressure are communicated to the flow sensor. In some embodiments, these patterns of pressure are communicated to points of control where the input can be increased or decreased. Pressure measurements and patterns of pressure may also be communicated to outside persons or machines for purposes of review or management.

In some embodiments, a detector, whether a flow detector or a pressure detector, takes measurements of either flow or pressure of liquid or gas that is distributed among two or more transporting paths, where each path may have its own valve or other point of termination. As a result of a variety of factors, each distribution path may have its own pattern of flow or pressure. Various such factors might include, for example, leaks in the path, blockage in the path, width of the pipe, shape of the pipe (for example, straight or curved or bent; or for example, constant or tapered in a narrowing manner or broadened), material of the pipe, amount of opening at the terminal point, and others. When there is a change in the flow or pressure detected by the sensor of multiple paths, the data collected by the sensor may allow either the sensor or a processor to determine which path has experienced the leak or blockage. All of this may be achieved with the single detector, and without the use of multiple detectors or sensors at multiple paths in the transporting network.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

Figure 1:
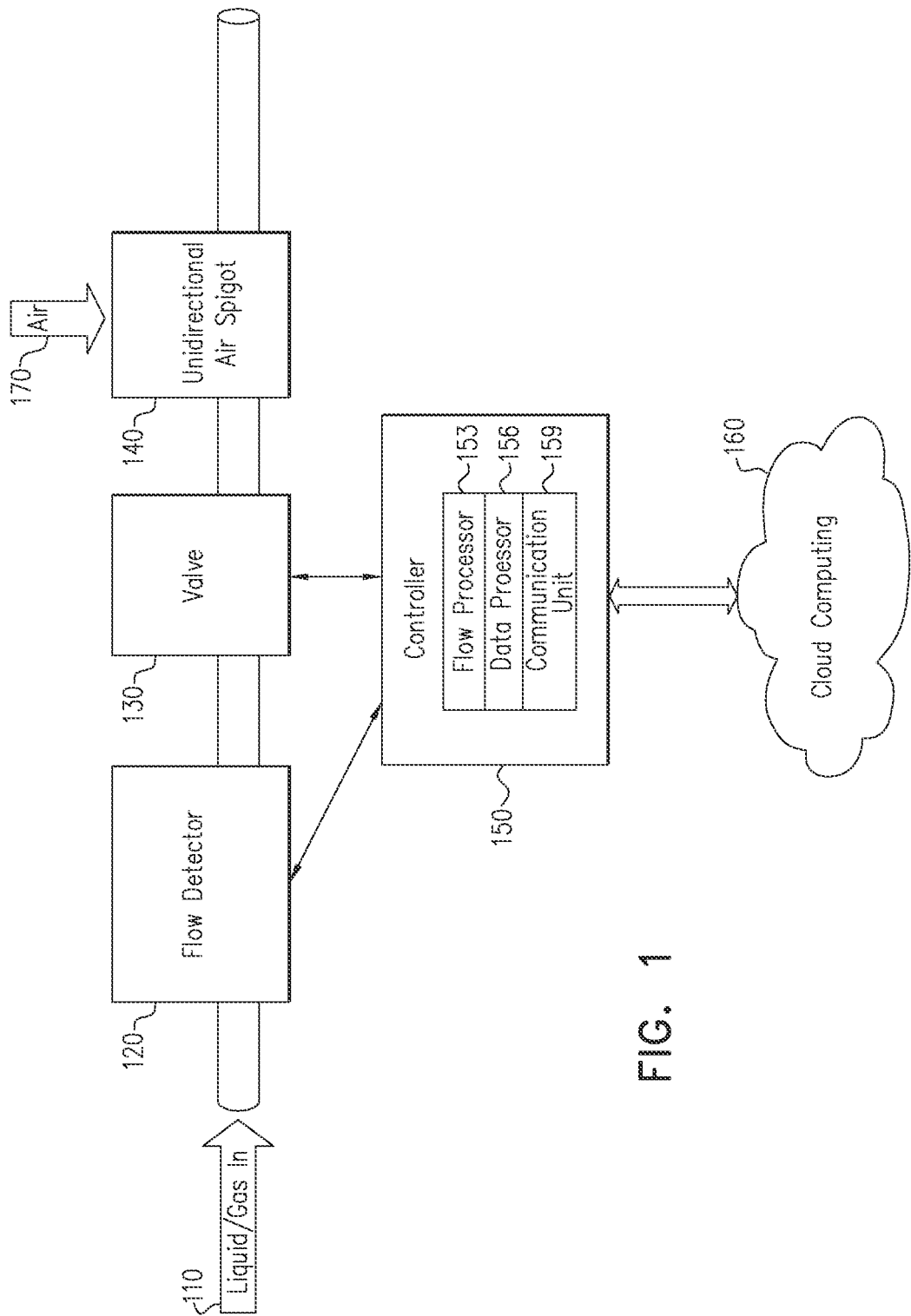
FIG. 1 is a block diagram of a system for measuring and controlling leakage in a transporting network, according to one embodiment.

Described herein are systems, devices, and methods for detecting liquids or gases.

Herein, the following terms shall have the meanings indicated.

"Transporting network" is a network for distributing a liquid or gas throughout a physical location. One example may be a network for transporting water within an apartment building. A second example may be an air conditioning network for transporting cooled air throughout a shopping center. A third example may be a network for transporting a specific gas to different points in a chemical factory.

"Detecting" is identify the presence, rate of flow, and direction of flow of a liquid or gas at a certain point in a transporting network and at a certain point in time. Detecting is performed by a "flow detector," sometimes called a "flow detector," and a "controller."

"Flow detector," also called "detector," is a device that measures and collects data about rate of flow and direction of flow of liquid or gas in a transporting network. It is also transmits such data to a controller.

"Controller" is a device that receives data from a detector, and processes it according to one or more algorithms to determine the rate of flow and flow of a liquid or gas in a transporting network. In some embodiments, the controller compares data received from a detector with data in a database about expected flow and direction of flow of liquid or gas in the transporting network at a certain time of the day and according to certain physical conditions.

"Small leak" is a leak minor enough so that corrective action need not be taken. For example, an intermittent dripping. However, the term "small leak" may be defined by the owner or manager of the transporting network. This will be based in part on the size and purpose of the network. For example, an individual home owner might define "small leak" as 100 mL/hour. Or the home owner might define "small leak" as 50 mL/hour, or 200 mL/hour, or something else. The definition could tie into home insurance as well, for example, where an insurance company gives a discount for a higher rate definition, since the lower rate is absorbed entirely by the individual rather than the insurance company. Or a lower rate could be defined, with a contractual commitment to the insurance company from the owner to fix any problem beyond this lower rate. A commercial business might take the same general approach, but the rate is likely to be higher due to the great volume of water moving through the system and the greater size of the premises in comparison to a home. For example, the business might define "small leak" as less than 200 mL per any one leak and less than 500 mL in the aggregate from multiple leaks. Many different implementations are possible. Further, the definition of "small leak" may change over time, either automatically due to varying conditions or according to any criteria defined by the owner or manager of the transporting network.

"Real leak" is a leak that is more serious than a small leak, and which would therefore require some kind of corrective action, although such action need not be taken immediately. Non-intermittent but low flow would be one possible indicator of a "real leak." The owner of manager of the transporting network may set criteria for defining a "real leak." For example, the owner of a commercial establishment may set a higher rate of flow for a leak to be real, than would be set by the owner of private residence. "Real leak," however defined at any particular time, would be defined as a higher rate than a "small leak," presumably starting at the highest level for a small leak. For example, if a "small leak" is less than 200 mL/hour, then a "real leak" would be 200 mL/hour or more, up to the level of a critical leak, which is itself definable by the owner or manager. Again, the actual range for "real leak," both lower and higher limits, are set by the owner an manager, and will depend, at least in part, on the total volume of liquid or gas moving through the transporting system in a period, the maximum and average rates of flow, the purposes for which the flows exist—as examples of such purposes, home, commercial sales, warehouse, factory, or other.

"Critical leak" is a leak that is more serious than a real leak. One indication of such a "critical leak" is a leak in which the rate of leakage can cause to damage immediately to the transporting network. The owner or manage of the transporting network can set criteria for defining a "critical leak" as opposed to a "real leak." Solely as an example, a criterion might be set as twice the average peak on work days, where any leak with a higher rate of flow would be "critical," otherwise a "real leak" or even "a long leak." In some cases, the criteria for "critical leak" are set such that immediate action is required to respond to such a leak. "Critical leak" sets a floor, and any leakage at that level or beyond is "critical." For example, if "critical leakage" for a factory is defined as "500 mL/hour or more," and "small leak" is defined as less than 200 mL/hour, then "real leak" may be defined as "200 mL/hour or more, but less than 500 mL/hour."

The definitions of these three terms, "small leak," "real leak," and "critical leak," may be set by the owners or managers, and may be varied by time of day, or by season of the year, or by particular events, or by any other criteria determined by the owner or manager. Since the measurement and control system measures leakage and converts that leakage number into a numerical flow rate, and since the system numbers are subject to change either automatically or by direct human invention, the system can be customized according to the owner or manager's continuing or changing definitions of these three terms.

"System learning" is a process in which the measurement and control system receives data about flow in the transporting network, applies algorithms to the data to convert such data into information about usage supported by the network. Examples of such information might be average flow at a particular time of the data, peak flow during some time period, nadir flow during some time period, or total flow over some time period.

"Background noise" is movement of liquid or gas that is in, as opposed to through, a transporting network. Liquid and gases make seeming random within the network, such as an eddy, that does not move the liquid or gas through the system. This noise must be identified and neutralized either by physical cancellation or by use of algorithms that subtract out such noise.

"Static state" is a point in time in which there is no flow, or insignificantly small flow, in a transporting network.

"Dynamic state" is a point in time in which there is non-insignificant flow of liquid or gas in a transporting network.

"Emptying the transporting network" is causing that liquid or gas in the transporting network located beyond a value, to exit the transporting network. In some embodiments, the value is closed and the liquid or air drains out by gravity or by natural flow. In some embodiments, air is let into the transporting system which helps push out the liquid or gas.

"Valve" is a valve attached to a transporting network that may be open or closed. When open, liquid or gas continues to flow through the transporting network. When closed, the liquid or gas beyond the valve exits the transporting network, there is no flow into the transporting network, and the liquid or gas in the transporting network before the flow is in a static state or perhaps experiencing backflow. A "valve" may be electrical, as portrayed in the figures, and may be operated automatically or by human intervention. Alternatively, a "valve" may be mechanical, operated by a person. In some embodiments, there may be a double valve, both electrical and mechanical, for backup purposes.

"Blockage" is a point in the transporting network where transport is impeded in some way by a narrowing of the pipe or other flow mechanism. This may due to rust in the pipe, or the attachment of some kind of material to the wall of the pipe, or the entry of some kind of material into the pipe that does not flow as easily as the liquid or gas. Blockage may be either total, allowing the passage of no liquid or gas, or it may be partial, with reduced passage.

FIG. 1 illustrates one embodiment of a system for measuring and controlling leakage in a transporting network, according to one embodiment. According to various embodiments in the illustration, the exemplary system can perform flow analysis by measurement with smart sensors, perform flow direction analysis, use statistical analysis and algorithms to perform such analyses, close or open flow into the transporting network, close or open flow out of the transporting network, and allow air input into the transporting network in order to aid in measurements and in the determination of static and dynamic states within the transporting network.

A liquid or gas 110 enters into transporting network, where it may be measured by a flow detector 120. The detector 120 has a sensor or other device that may measure a rate and direction of liquid or gas flow. Any device that may measure flow directly or indirectly might serve as a flow detector. Non-limiting examples of a flow detector 120 include a rotameter, an EM Doppler measurer, an ultrasonic device, a thermal detector, a Coriolis detector, an acoustic detector, and a pressure detector. After the liquid or gas passes the detector 120, it passes an valve 130 and then continues in the transporting network. There are multiple functions that the valve 130 may perform. In some embodiments, closure of the value 130 stops entry of liquid or gas 110 into the transporting network, and liquid or gas located beyond the valve 130 may empty out of the transporting network. The valve 130 is then opened, input of liquid or gas 110 renews, there is a rush of flow into the transporting network, and the detector 120 measures the rate and direction of the flow. In some embodiments, air 170 is allowed into the transporting network by a unidirectional air spigot 140 while the valve 130 is closed, helping to force out liquid or gas in the transporting network located beyond the valve 130, thereby increasing the speed and effectiveness by which the liquid of gas 110 flows out of the transporting network, thereby increasing the sensitivity of the measurement by the detector 120 when the valve 130 is opened and input is renewed In some embodiments, the air 170 may simply be allowed to enter the transporting network. In other embodiments, the air 170 may be forced into the transporting network.

Another possible function of the valve 130, in some embodiments, is that if there is a critical leakage in the transporting network, a controller 150 may order the valve 130 to close, thereby stopping the leak. In some embodiments, the valve 130 reports back to the controller on its state of being opened or closed.

After the detector 120 performs measurements, it sends the data to the controller 150 which can perform multiple functions according to various embodiments. The controller 150 comprises at least a flow processor 153, a data processor 156, and a communication unit 159. The detector sends the data to the communication unit 159 within the controller 150, which directs it to the flow processor 153, which converts analog data from the flow detector 120 into digital data by well-known analog-to-digital conversion techniques. The flow processor then sends the digital data to the data processor 156, which processes the data to determine the rate and direction of the flow.

In some embodiments, the measurement and control system has been provisioned by prior learning of the static and dynamic states of the transporting network, which allows the data processor 156 to send and compare current data with data in a database of static and dynamic states at different periods of time in a day or in a week. This comparison is conducted in accordance with a statistical algorithm that determines expected flow rate and flow direction at a period of time, and the expectation is compared against actual flow data to help determine the probability and severity of a leak. As one example of the process, the data processor 156 will calculate expected background noise at the time of measurement, and will subtract such noise from the digital data in order to determine the true flow. The data processor 156 then sends the information based on the data to the communication unit 159.

In some embodiments, the data processor 156 is located within the controller 150, as show in FIG. 1. In alternative embodiments, the data processor 156 may be located off-site, distant from the detector 120, in which a communication line maintains data flow between the detector 120 and the data processor 156.

The data processor 156 may perform any or all of various functions, including control of the valve 130, manage the communication with the detector 120, learning the static and dynamic states of the transporting network though use of a learning mechanism algorithm, managing log file of the flow through the transporting network, determining noise in the transporting system, subtracting the noise measurement to determine the actual flow in the transporting network, understanding the flow direction, and determining whether an anomaly is a real leak.

The communication unit 159 is the element that is contact with both other parts of the measurement and control system and with the outside world. This unit 159 receives data from the detector 120, and may tell the detector 120 when to measure or stop measuring. The communication unit 159 is also in contact with the valve 120, may tell the valve 120 when to open or close, and receives from the electrical valve 130 information as to whether the valve 130 is open or closed. Also, the controller 150 through the communication unit 159 communicates with the outside world. The unit sends information to the information cloud 160, and may receive information from the cloud in the form of requests for further information or commands to close the electrical valve 130. Such requests for further information or such commands may be entirely automated, or may be generated by human operators, all as explained in greater detail in the discussion of FIG. 4 below.

Figure 2:
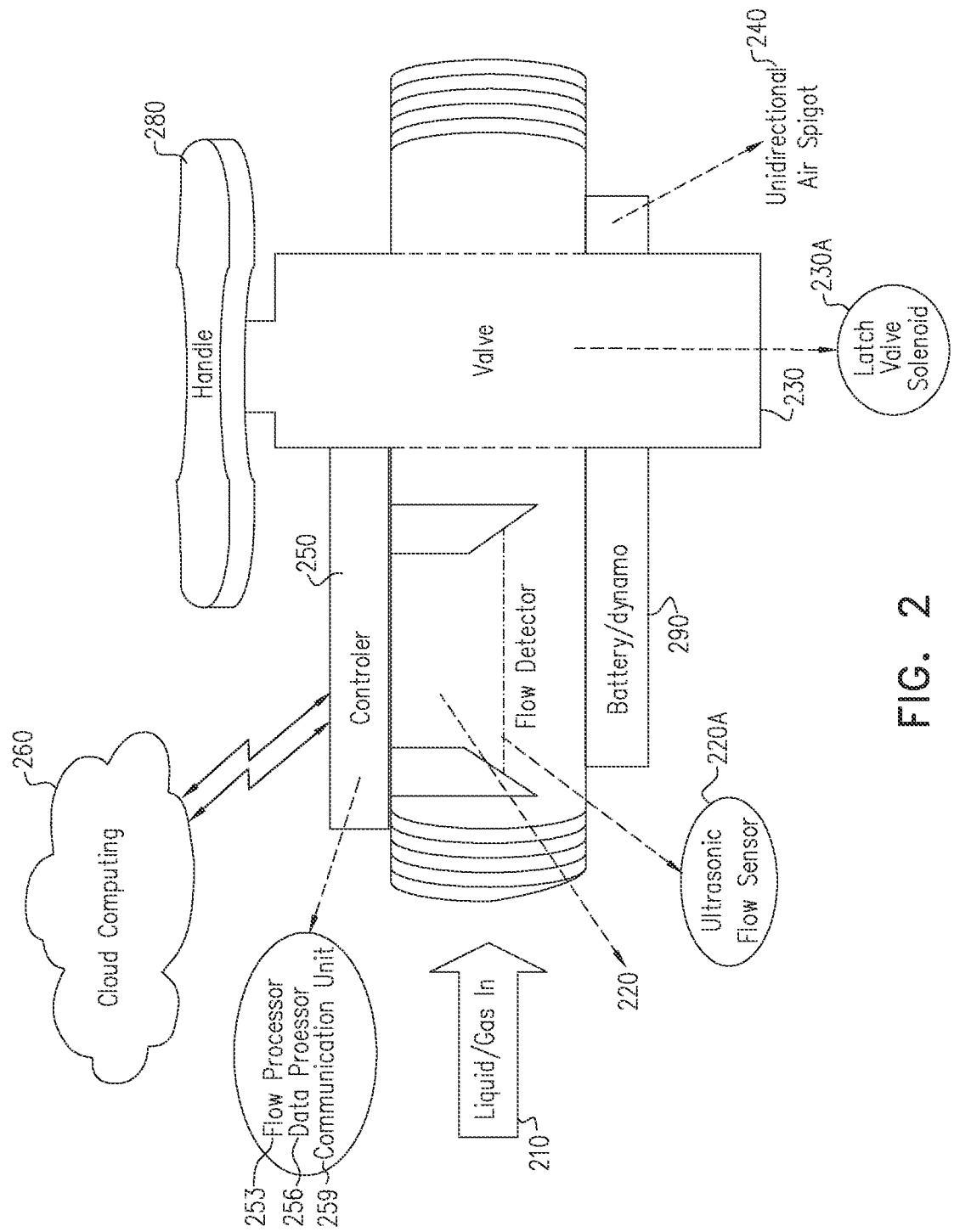
FIG. 2 is a system for measuring a system for measuring and controlling leakage in a transporting network, according to one embodiment, illustrating one possible placement of various components of the system.

FIG. 2 illustrates many of the same elements as in FIG. 1, but adds additional elements, and also shows one embodiment of how measurement and control system might actually appear in one possible physical configuration. Liquid or gas 210 enters into the transporting network, is measured by a flow detector 220 which may be an ultrasonic flow sensor 220A or a different sensor, and continues to an electrical valve 230 which may be a latch valve solenoid 230A or another type of valve that may open or close electronically. The data flow is managed by a controller 250, which comprises a flow processor 253, a data processor 256 which in this embodiment is within the controller 250, and a communication unit 259. The controller 250, through the communication unit 259, is in communication with the detector 220, the electrical valve 230, and the outside world through cloud computing 260. In some embodiments, a unidirectional air spigot 240 allows the entry of air to empty the transporting network prior to flow measurement by the detector 220. FIG. 2 also shows a handle 280, which allows manual opening or closing of the valve in case the electrical system does not work, or if it is preferred to opening and closing the valve be done by people rather than by automated device. It is also possible, in some embodiments, to replace the electrical aspect of the electrical valve 230, so that the valve operates only manually with a handle 280. FIG. 2 also shows a power source 290, which may be a battery or dynamo as shown, but which might also be a generator, or the electricity network, or any other sources of electrical power.

Figure 3:
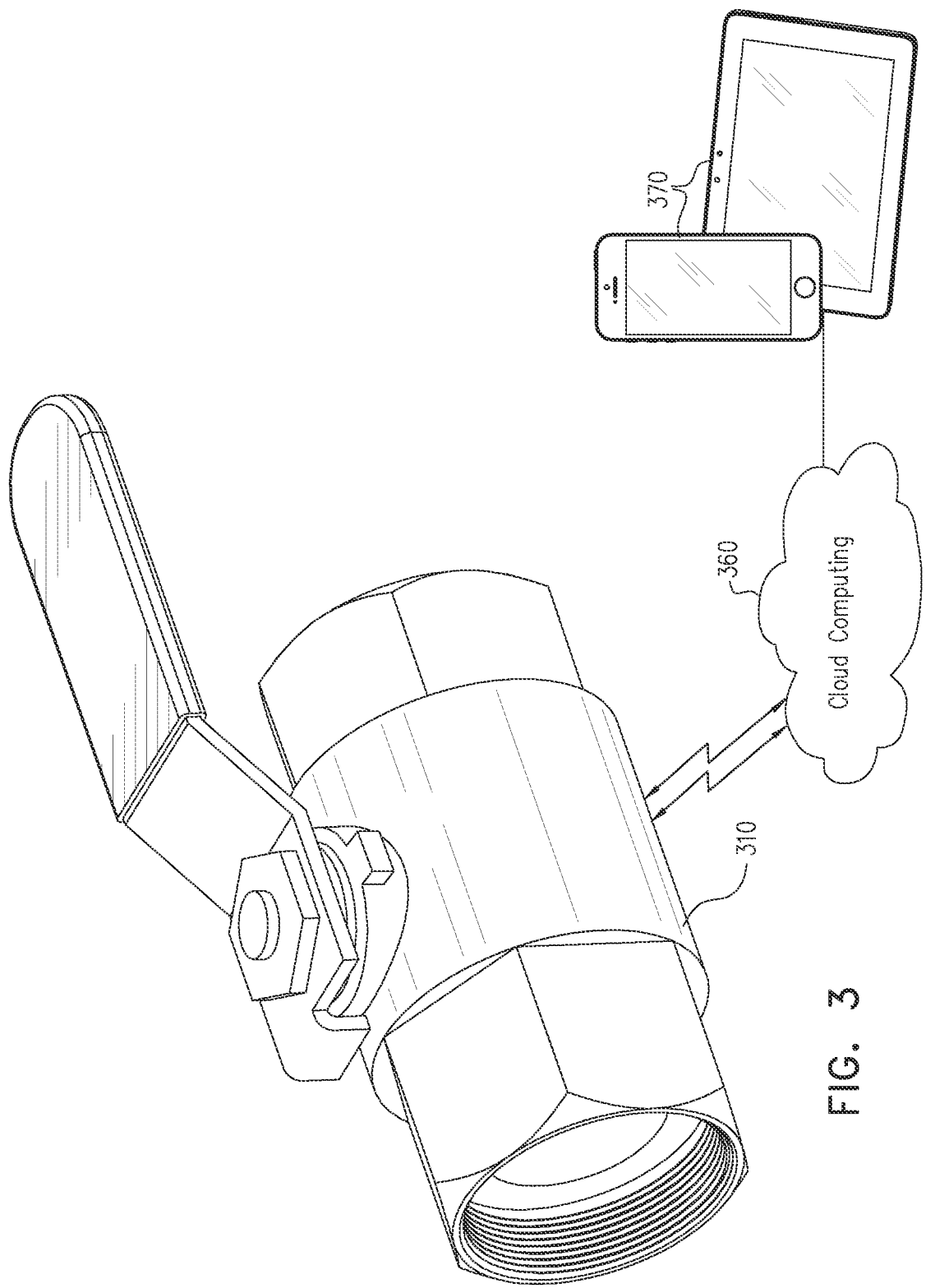
FIG. 3 is the external appearance of a system for measuring and controlling leakage in a transporting network, according to one embodiment.

FIG. 3 is the external appearance of a system for measuring and controlling leakage in a transporting network, according to one embodiment. The physical appearance is shown in its entirety in physical housing 310. Some of the specific elements of the system, such as the flow detector 220, the valve 230, the unidirectional air spigot 240, that controller 250, and the battery or dynamo 290, are inside the physical housing 310, and hence not shown. In this particular embodiment, there is a handle, similar to the one shown in FIG. 2 at 280, but in other embodiments there is no handle. Also shown is a communication connection between the physical housing 310 of the system and remote units 370, which is effected via a communication cloud 360. Various possible embodiments of the communication connection are discussed in great specificity in regards to FIG. 4 below.

Figure 4:
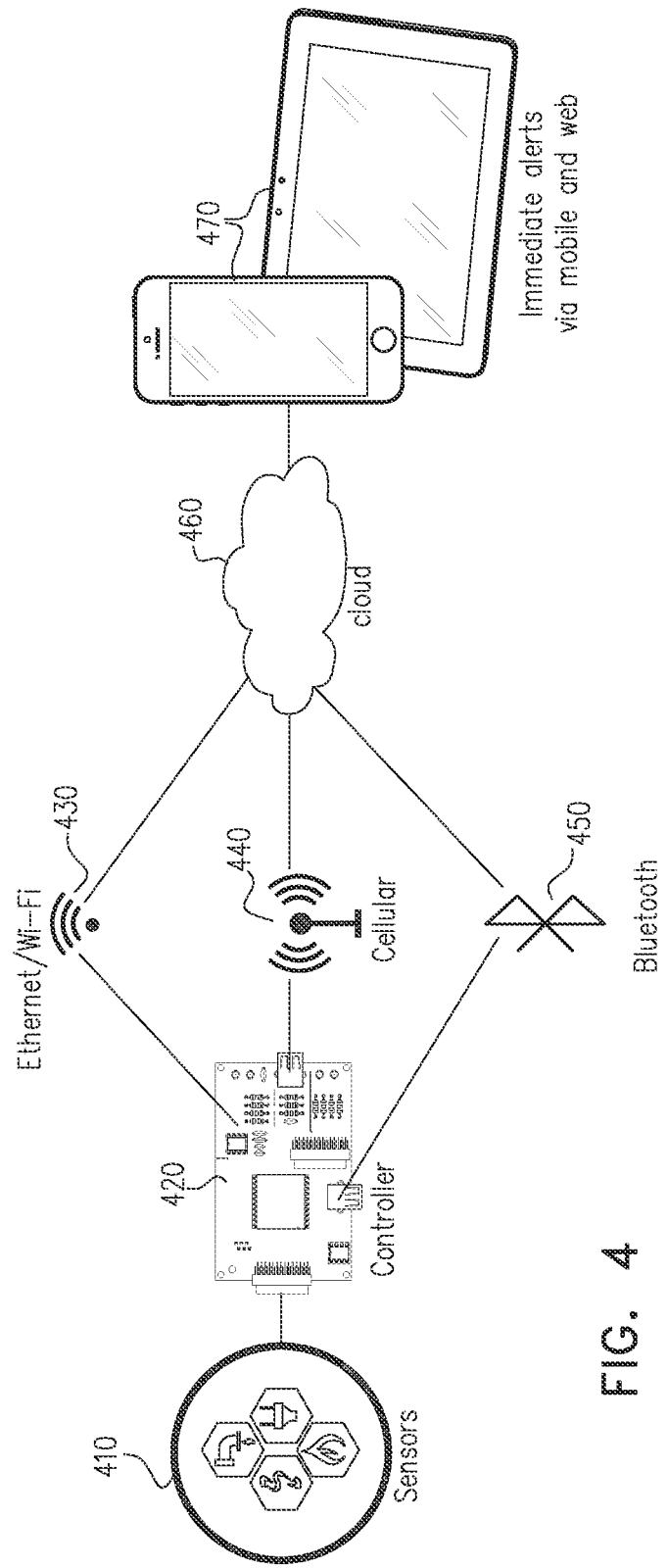
FIG. 4 is a system for measuring and controlling leakage in a transporting network, connected to a communication network, according to one embodiment.

FIG. 4 is a system for measuring and controlling leakage in a transporting network, connected to a communication network, according to one embodiment. The measurement and control system is represented by the sensors 410 and the controller 420. In order to measure and control a particular point of flow in a transporting network, only one sensor is required. However, in a transporting network with branching, multiple sensors may be deployed, where each sensor measures one branch of the network and hence identifies the specific place of a leakage. For example, in an apartment building with multiple partners, it is possible to place a different sensor to measure the flow into each individual apartment, and in that way to identify a leak in that part of the network located within a specific apartment.

The controller 420, communicates with the outside world through a communication unit not shown. Any type of communication that allow connection between the system and the outside world may be used. Here, for example, non-limiting examples include Ethernet running over Wi-FI 430, the cellular network 440, and Bluetooth 450, each of which is communicatively connected, in two-way connection, with a cloud 460. Other methods not shown include satellite, mesh, and other wireless methods. In theory, connection through a wireline network is also possible, although as a practical matter it is unlikely that every system attached to a transporting network will be connected by wire to a communications cloud. In some embodiments, there may be a combination of wireless and wireline. For example, all of the sensors may be connected via a wireless method to a central data collection point, and that point may then be connected via wireline to the cloud 460.

The system via the cloud 460 is connected communicatively to remote devices 470, such as a cellular telephone of a human operator, or a computer screen which may be accessed via a URL. In these cases, the communication may be only by reporting to the remote devices 470, or the remote devices may be enable to send communications back through the cloud 460 to the communication method 430/440/450, hence to the communication unit within the controller 420 and then to the system. For example, a human operator with are remote device 470 may receive a report, then command the measurement and control system through the cloud to close an electrical valve.

One embodiment is a system for measuring and controlling leakage in a transporting network containing a gas or a liquid 110. In one particular implementation of such embodiment, there is a transporting network which allows the movement of a liquid or gas from one point in the network to one or more additional points. There is flow detector 120 for measuring the rate of flow and direction of flow of the liquid or gas in the transporting network. There is also a controller 150 for receiving and processing data from the flow detector 120, in order to determine if there is a leak in the transporting network, and if there is a leak, to determine the rate of the leakage flow.

In a first possible configuration of the system just described for measuring and controlling leakage in a transporting network containing a gas or a liquid 110, further the controller 150 includes a flow processor 153 that receives the data from the flow detector 120, a data processor 156 for converting the data into usable information about the rate and direction of flow at the point of measurement, and a communication unit 159 that reports the information to an outside device or person 470. In various embodiments, the controller 150 through the communication unit 159 also communicates cause the flow detector 120 to measure or cease measurement, to open or close an electrical valve 130, and to receive requests for additional information or commands from outside devices or persons 470.

In a second possible configuration of the system described above for measuring and controlling leakage in a transporting network containing a gas or a liquid 110, further the flow detector 120 may be any device that can measure the rate of flow of a gas or liquid 110. Non-limiting examples include a rotameter, an electromagnetic Doppler measurement detector, an ultrasonic detector, a thermal detector, a Coriolis detector, an acoustic detector and a pressure detector.

In a third possible configuration of the system described above for measuring and controlling leakage in a transporting network containing a gas or a liquid 110, the system further includes a unidirectional air spigot 140 which may be opened to allow air to enter into the transporting network while flow input is blocked, thereby allowing the transporting network to empty of liquid or gas 110 before the measurement and control system measures the flow and direction in the transporting network. In some embodiments, there is also a handle attached to unidirectional air spigot 140 that may be opened by a human operator.

In a fourth possible configuration of the system described above for measuring and controlling leakage in a transporting network containing a gas or a liquid 110, further the system includes a source of power 290 for the flow detector 120, the electrical valve 130, and the controller 150, and the source of power may be a battery, a dynamo, a generator, the electricity network, solar power, or any other source of electrical power.

In a fifth possible configuration of the system described above for measuring and controlling leakage in a transporting network containing a gas or a liquid 110, further the electrical valve 130 is a latch valve. Further, in some embodiments the electrical valve 130 has a handle 280 which may be operated by a human operator instead of an electrical opening or closing, or as a supplement to electrical opening and closing.

In a sixth possible configuration of the system described above for measuring and controlling leakage in a transporting network containing a gas or a liquid 110, further the system includes multiple electrical valves and sensors, any or all of which may be opened or closed to measure flow and direction, to determine leakage, or to close part of the transporting network.

Figure 5:
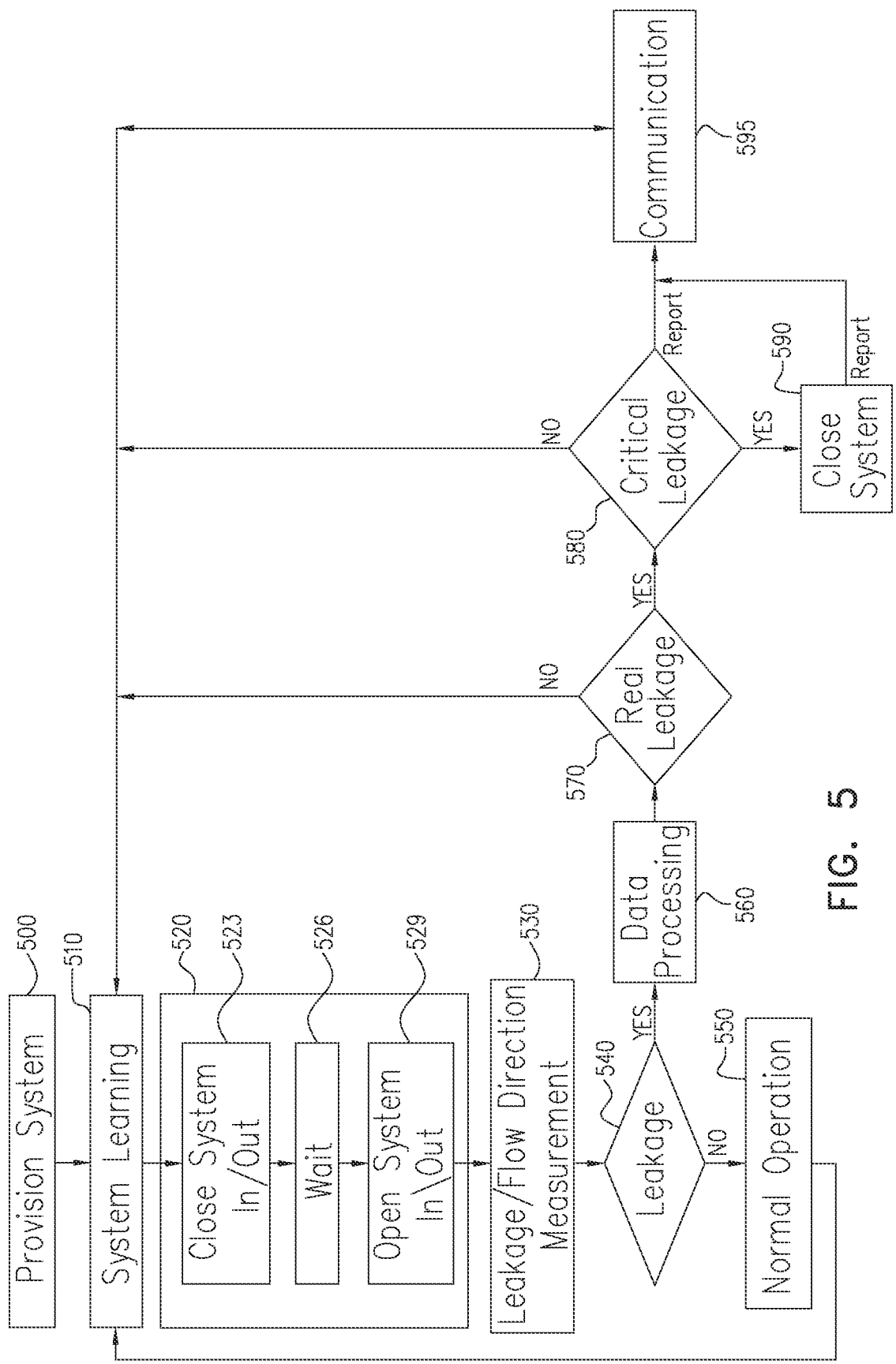
FIG. 5 is a method for measuring and controlling leakage in a transporting network, according to one embodiment.

FIG. 5 is a method for measuring and controlling leakage in a transporting network, according to one embodiment. A measurement and control system is provisioned 500. In some embodiments, provisioning 500 is performed by the system's learning the flow characteristics of the transporting network at the location to be measured 510. The learning is done by a repetitive process 520 of closing the input of the transporting network 523, waiting a very short time 526, then opening the input of the transporting network 529, and measuring the rate of flow and the direction of liquid or gas entering the transporting network 530. In this sense, "a very short time" is long enough for the system to empty out, typically on the order of two to four seconds. In some embodiments, air is let into the transporting network, or air may be forced into the transporting network, both to speed the process of emptying and to insure there is no residue or only a very small quantity of liquid or gas in the transporting network when measurements are taken.

There may be leakage in the network 540, but the goal of the provisioning process is to learn the time characteristics of usage of the transporting network. Decision of leakage 540 is done by the data processor 560 together with system learning 510 When there is no or negligible flow, that is considered a "static state" of the transporting network, but if there is significant flow then the transporting network is considered to be in "dynamic state." The rate of flow will vary in different dynamic states, so that enough measurements must be taken at enough time periods in a day for the measurement and control system to learn 510 the characteristics of the normal flow. A database is created of the times of day when the transporting network is static or dynamic, and if dynamic then the rates of flow at dynamic times. Direction of flow generally occurs in one way, for example, as show in FIGS. 1 and 2 from left to right through the transporting network. However, leakage within the transporting network could cause a backflow in the opposite direction of the input, and that is one reason the system also measures direction of flow 530.

In some embodiments, the system continues to perform the measurement steps within step 530, then the system determines at each measurement if there is a leakage 540 in the transporting network. This is done by comparing the rate of flow and direction of flow characteristics at a particular time to the data base for the transporting network at that time. Further, in some embodiments such comparison to the data base is supplemented by multiple measurements within a short period of time, to see if there is any change in the dynamic state of the transporting network.

The measurement and control system determines if there is any leakage 540 If there is no leakage, then the system continues normal operation 550, and the data of no leakage is sent back to the system for additional learning 510, in which the system adds the information of no-leakage to the database of usage at this point of measurement.

If at the point of measurement 540 there is leakage, then measurements of the leakage are sent a controller which performs data processing 560 through a data processor. Based on that processing, the controller determine if there is "real leakage" 570, as that term has been defined. If not, then the information is sent back to system learning 510, and no other action need be taken. If there is real leakage, the system asks if there is "critical leakage" 580, as that term has been defined. If the answer is no, then the information is sent back to system learning 510, and no other action need be taken. However, if there is critical leakage 580, then one option is that the measurement and control system closes input of the transporting network 590 at the point of measurement. Whether or not closure 590 occurs, a report is sent to a communication unit 595, which sends the information to the system learning. In some embodiments, the communication unit will also report to remote devices 470 via a cloud 460, and the remote devices may issue to the system either requests for further information or orders to open or close various points of the transporting network.

In other embodiments, the communication may not be configured to send automatic reports to remote units 470, but the system may send an order to the communication unit to send a report of critical leakage to the remote units 470 for further action.

Various embodiments described herein involve one measurement and control system with a flow detector 120, electrical valve 130, and controller. However, in alternative embodiments there may be two or more detectors 120, placed at different points within a transport system, thereby allowing measurement of those different points to monitor such points, or to pinpoint the location of a leak within the transporting network. Typically there will be an electrical valve 130 associated with each of the multipole flow detectors 120, although in alternative embodiments a particular detector 120 may not have an associated valve 130, or there may be two more valves 130 per detector 120 to control different points in the network. Further, a controller 150 in an exemplary embodiment may receive and process data from multiple detectors 120 and valves 130, although in a large transporting system such as a multi-story building there may be two or more controllers 150.

Figure 6:
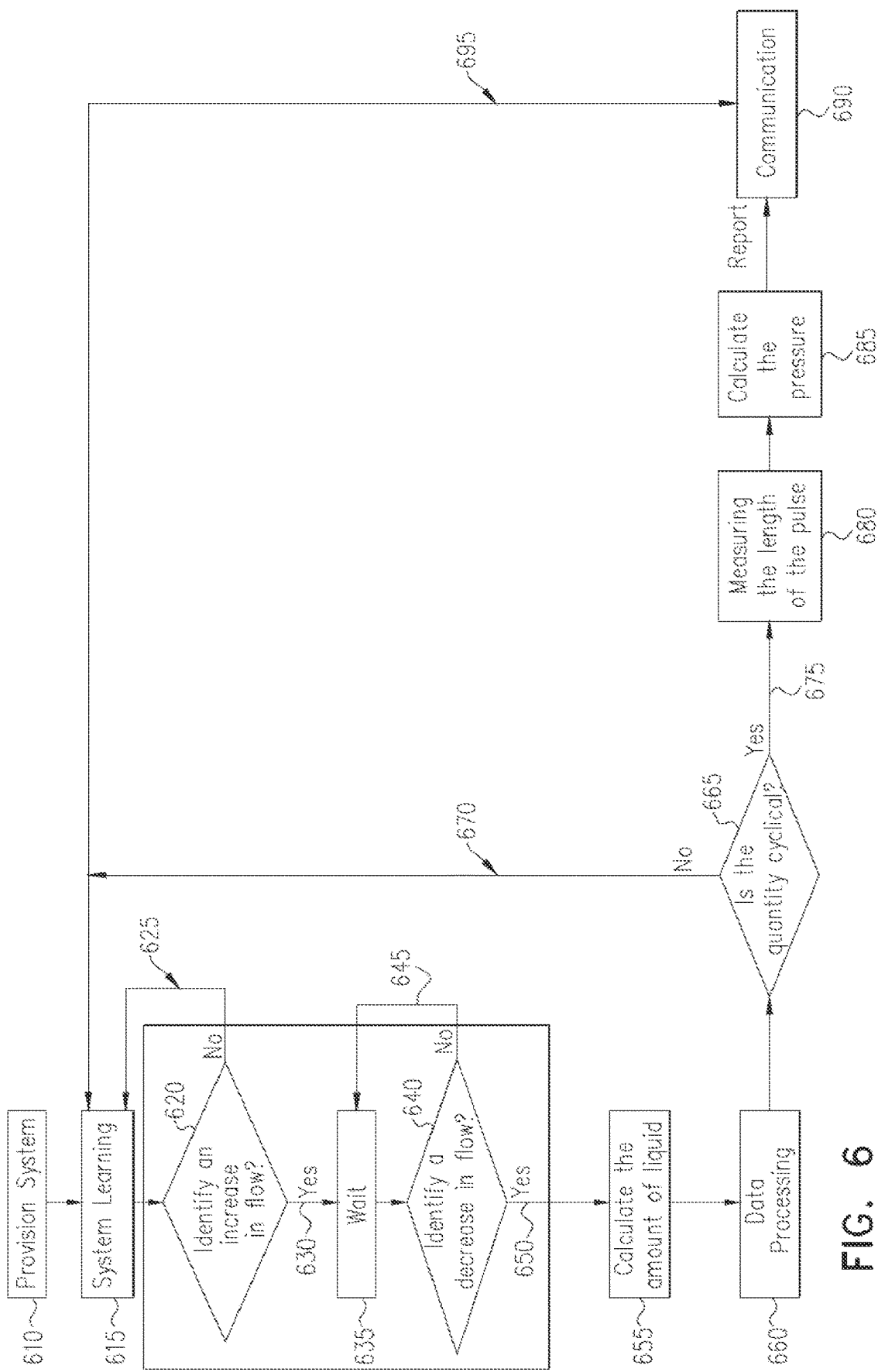
FIG. 6 is a method for measuring and controlling pressure in a transporting network, according to one embodiment.

FIG. 6 is a method for measuring and controlling pressure in a transporting network, according to one embodiment. A system is provisioned 610 by the placement of sensors and processors. System learning 615 is a continuation of the provisioning, including, among other things, the entry of algorithms into the system to enable to accept, process and use data about liquid or gas flow and pressure. Measurements are taken at a point of measurement—in FIG. 6 this is shown as identifying a rise in flow 620 or not. If not, 625 the system returns to the steady state, but if so 630 the system waits for a predetermined period of time 635 to then determine if there has been a countering decease in flow 640. If there has not been a countering decrease 645, then the system waits again 635, and measures again 640 for the countering decrease. If there has been a countering decrease in flow 650, then that will be reported. This process of measuring increase and decrease in flow may be duplicated any number of times, with different time intervals for the wait, to determine if the rise in flow was temporary, and if so, over what period of time. In an alternative embodiment, a decrease in flow in measured before the system then measures for a countering increase of flow.

After the increase and decrease in flow have been determined, within a measured period of time, the system, either the measuring detector or processor, calculates the amount of liquid or gas passing through the system in the period of time 655. This information is sent for data processing 660 where the system determines if the change of quantity is cyclical or otherwise repetitive 665. If not, that negative determination may be sent back to the detector 670. If so, 675, the length in time of the pulse of increase and decrease in flow is determined 680, which allows the system to calculate the pressure 685 during that pulse of increased flow, for example, by measuring the fluid flow rate and substituting it into Bernoulli's equation. This calculation may then be sent 690 by a communication unit back to the detector 695, where it becomes part of the system learning 615. In addition, or alternatively, the communication unit 690 may communicate through a computing cloud either to the detector at 615 or to outside parties or machines for further processing.

Figure 7:
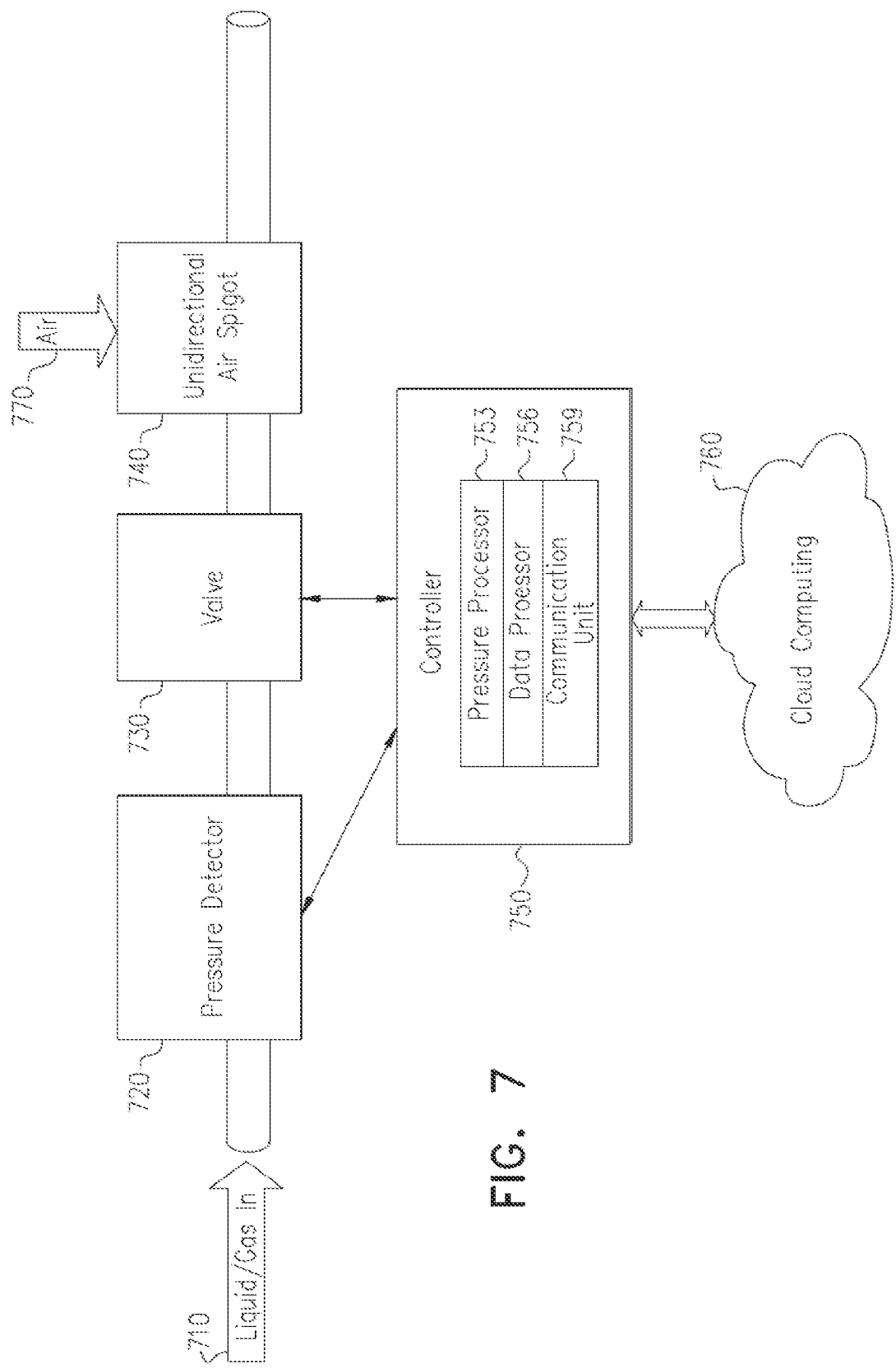
FIG. 7 is a block diagram of a system for measuring and controlling pressure in a transporting network, according to one embodiment.

FIG. 7 is a block diagram of a system for measuring and controlling pressure in a transporting network, for the purpose of identifying or responding to either a leakage or a blockage, according to one embodiment. According to various embodiments in the illustration, the exemplary system can perform pressure analysis by measurement with smart sensors, perform flow direction analysis, use statistical analysis and algorithms to perform such analyses, close or open flow into the transporting network, close or open flow out of the transporting network, and allow air input into the transporting network in order to aid in measurements and in the determination of static and dynamic states within the transporting network.

A liquid or gas 710 enters into transporting network, where it may be measured by a pressure detector 720. The detector 720 has a sensor or other device that may measure a rate of pressure and direction of liquid or gas flow. Any device that may measure pressure directly or indirectly might serve as a pressure detector. Non-limiting examples of a pressure detector 720 include a gauge pressure detector, a relative pressure detector, a sealed gauge pressure detector, and various industrial pressure detectors of various structure and sensitivity. After the liquid or gas passes the detector 720, it passes a valve 730 and then continues in the transporting network. There are multiple functions that the valve 730 may perform. In some embodiments, closure of the value 730 stops entry of liquid or gas 710 into the transporting network, and liquid or gas located beyond the valve 730 may empty out of the transporting network. The valve 730 is then opened, input of liquid or gas 710 renews, there is a rush of flow into the transporting network, and the detector 720 measures the pressure and the direction of the flow. In some embodiments, air 770 is allowed into the transporting network by a unidirectional air spigot 740 while the valve 730 is closed, helping to force out liquid or gas in the transporting network located beyond the valve 730, thereby increasing the speed and effectiveness by which the liquid of gas 710 flows out of the transporting network, thereby increasing the sensitivity of the measurement by the detector 720 when the valve 730 is opened and input is renewed In some embodiments, the air 770 may simply be allowed to enter the transporting network. In other embodiments, the air 770 may be forced into the transporting network.

Another possible function of the valve 730, in some embodiments, is that if there is a critical leakage or critical blockage in the transporting network, a controller 750 may order the valve 730 to close, thereby stopping the leak. In some embodiments, the valve 730 reports back to the controller on its state of being opened or closed.

After the detector 720 performs measurements, it sends the data to the controller 750 which can perform multiple functions according to various embodiments. The controller 750 comprises at least a pressure processor 753, a data processor 756, and a communication unit 759. The detector sends the data to the communication unit 759 within the controller 750, which directs it to the pressure processor 753, which converts analog data from the pressure detector 720 into digital data by well-known analog-to-digital conversion techniques. The pressure processor 753 then sends the digital data to the data processor 756, which processes the data to determine the rate of pressure and direction of the flow. In some embodiments, the measurement and control system has been provisioned by prior learning of the static and dynamic states of the transporting network, which allows the data processor 756 to send and compare current data with data in a database of static and dynamic states at different periods of time in a day or in a week. This comparison is conducted in accordance with a statistical algorithm that determines expected pressure rate and flow direction at a period of time, and the expectation is compared against actual pressure data to help determine the probability and severity of a leak or a blockage. As one example of the process, the data processor 756 will calculate expected background noise at the time of measurement, and will subtract such noise from the digital data in order to determine the true pressure. The data processor 756 then sends the information based on the data to the communication unit 759.

In some embodiments, the data processor 756 is located within the controller 750, as show in FIG. 7. In alternative embodiments, the data processor 756 may be located off-site, distant from the detector 720, in which a communication line maintains data flow between the pressure detector 720 and the data processor 756.

The data processor 756 may perform any or all of various functions, including control of the valve 730, manage the communication with the detector 720, learning the static and dynamic states of the transporting network though use of a learning mechanism algorithm, managing log file of the pressure through the transporting network, determining noise in the transporting system, subtracting the noise measurement to determine the actual pressure in the transporting network, understanding the flow direction, and determining whether an anomaly is a real leak or a real blockage.

The communication unit 759 is the element that is contact with both other parts of the measurement and control system and with the outside world. This unit 759 receives data from the detector 720, and may tell the detector 720 when to measure or stop measuring. The communication unit 759 is also in contact with the valve 720, may tell the valve 720 when to open or close, and receives from the electrical valve 730 information as to whether the valve 730 is open or closed. Also, the controller 750 through the communication unit 759 communicates with the outside world. The unit sends information to the information cloud 760, and may receive information from the cloud in the form of requests for further information or commands to close the electrical valve 730. Such requests for further information or such commands may be entirely automated, or may be generated by human operators, all as explained in greater detail in the discussion of FIG. 4. The computing cloud 760 may also be used to send data or processed results to other parts of the system such as the detector for system learning 615 or to outside parties or machines for further action.

Figure 8:
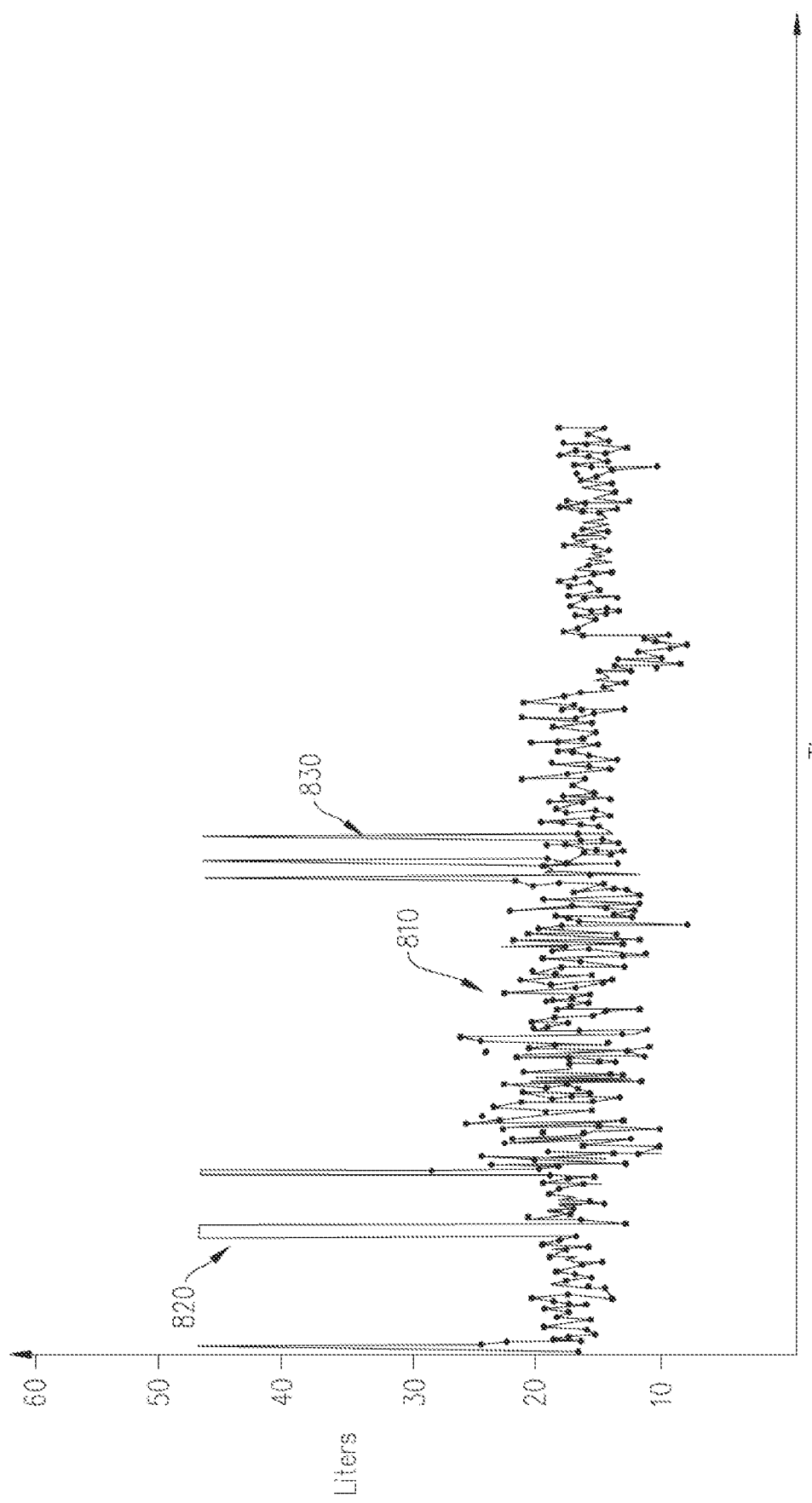
FIG. 8 is a graph of the measured flow rate over time at a point of measurement in a transporting network, according to one embodiment.

FIG. 8 is a graph of the measured flow rate over time at a point of measurement in a transporting network, according to one embodiment. In a typical network, while the network is active but not in use, the number of liters consumed over any period will be zero. FIG. 8, however, shows a system with a leakage of about eighteen liters per unit of time, which may be seconds, minutes, hours, or any other unit according to desired measurement. If there were no leakage in the transporting network portrayed in FIG. 8, then most of the measurements would be on zero liters. However, there is indeed leakage of about eighteen liters per unit of time, which is demonstrated by the fluctuations about that number as shown in 810. There are also higher peaks related to specific usage. For example, if FIG. 8 portrays the water system in a house, then 820 could represent the time during which a shower is being used, or a bathtub is filling with water. Conversely, in this example 830 could represent each time a toilet is flushed.

Figure 9:
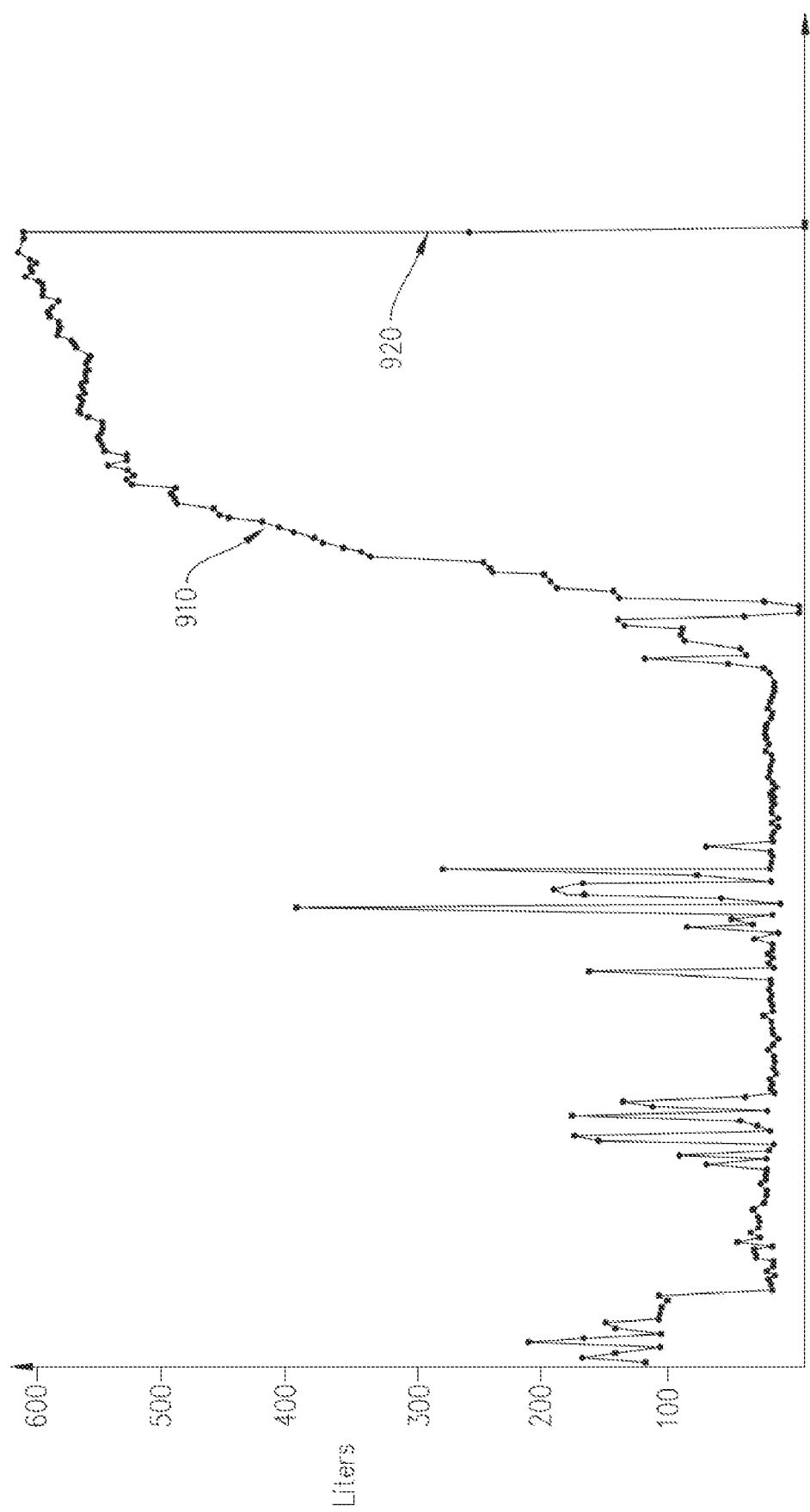
FIG. 9 is a graph of the measured flow rate over time at a point of measurement in a transporting network, demonstrating exceptional events of either leakage or blockage, and a response to such events, at a point of measurement in a transporting network, according to one embodiment.

FIG. 9 is a graph of the measured flow rate over time at a point of measurement in a transporting network, demonstrating exceptional events of either leakage or blockage, and a response to such events, at a point of measurement in a transporting network, according to one embodiment. In the usage pattern portrayed in FIG. 9, just as in the pattern in FIG. 8, there is a small leakage in the transporting network so that the base usage is more than zero. Moreover, in 910, the system measures a very large and rapid increase flow or pressure of the liquid or gas in the transporting network. This could be due to a very severe leakage or breakage in the transporting network. In response to this event, the network is shut down, meaning that inflow to the network is terminated, causing an extremely decrease in flow or pressure to zero 920. The shut off may be automatic, by a communicated message from a communication unit such as 759 or 159, or it may be done by a person actually shutting off the inflow. For example, if there is a break in the water system in the house, the flow may increase very rapidly 910, requiring that the water be shut off 920. After the problem is resolved, flow or pressure will return to normal.

Figure 10:
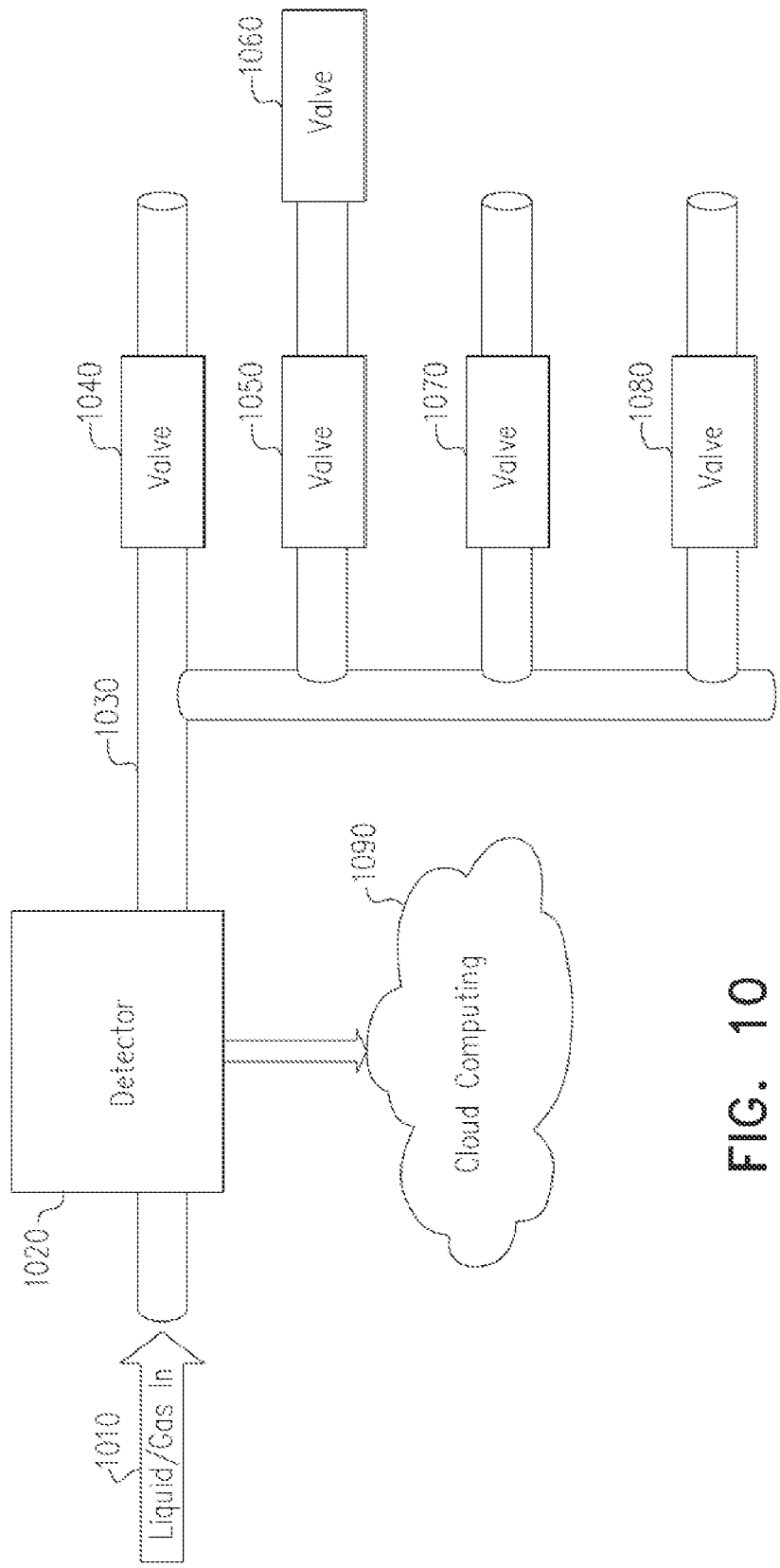
FIG. 10 is a block diagram of a system for measuring and controlling either flow or pressure in a transporting network, in which the network divides among multiple transporting paths and a detector measures flow or pressure at a point prior to the division among paths, according to one embodiment.

FIG. 10 is a block diagram of a system for measuring and controlling either flow or pressure in a transporting network, in which the network divides among multiple transporting paths and a detector measures flow or pressure at a point prior to the division among paths, according to one embodiment. FIG. 10 is an alternative embodiment of part of the system shown in FIG. 1 with a flow detector 120, or of part of the system shown in FIG. 7 with a pressure detector 720, and indeed, detector 1020 may be either a flow detector or a pressure detector in alternative embodiments.

In FIG. 10, there is an inflow of liquid or gas 1010 which is detected by the detector 1020, and then flows into a distribution pipe 1030 in the transporting network. At this point, the flow is divided among two or more transporting paths, each of which may have its own value to allow or deny flow 1040, 1050, 1070, and 1080. In the exemplary embodiment illustrate in FIG. 10, paths 1040, 1070, and 1080, lead to some kind of work or usage not depicted. The path illustrated by value 1050, however, is further regulated by value 1060 which allows additional branching through the transporting network. One useful feature of the embodiment illustrated in FIG. 10 is that flow and pressure is likely to be slightly different in each of the paths 1040, 1050, 1070, and 1080, due to shape or quality or material of the pipe in each path, or placement within the network, or whether a path is further distributed as is 1050, or whether a path is inside or outside, or other reasons. The system may determine, through repeated measurements, the flow or pressure patterns for each of the paths. When there is a change in flow or pressure detected by detector 1020, the system may infer by either the detector 1020 or a processor that the change has occurred at one of the specific paths 1040, 1050, 1070, or 1080. For example, a leakage or a blockage may cause a predictable change in flow or pressure, allowing the system to determine by algorithms and a database of past usage, where in the network the leak or break occurred. Depending on the sensitivity of the system, and the amount of branching beyond the first branch, the system may also be able to determine that if the leak or break occurred in a subsequently branch path 1050, the event may have occurred at a specific sub-branch such as 1060 or a different sub-branch. Finally, as in FIGS. 1 and 7, also in FIG. 10 the detector 1020 may communicate measurements, or patterns if they are calculated at the detector 1020, either directly to the rest of the system as part of system learning 615, or to either the system or outside parties via the information cloud 1090. The system may also identify and communicate which part of the transporting network, here for example 1040, 1050, 1070, or 1080, is being used over a specific period of time.

Various embodiments employ the hardware and methods discussed herein in conjunction with relevant algorithms. For example, measurement of flow or pressure, however it may be done, often generates measurement noise, which is filtered by a noise filtering algorithm. The learning of the transporting network's static state and dynamic states is assisted by an automated learning and control mechanism algorithm, which may also add additional information to a database of such states, and which may open or close the input point of the network, the output point of the network, and the electrical valves 130. The controller is, in one embodiment, a low power microcontroller that communicates with the outside world using wireless, wireline, IoT, or other technology.

Various non-limiting examples of system implementation include detecting a leak or blockage in a building's plumbing and/or water delivery network; detecting a leak or blockage in a building's gas pipes and/or other gas delivery system; detecting a leak or blockage in a spinning apparatus or network for water heating; detecting a leak or blockage in a water collection network; and detecting a leak or blockage in a fuel storage network.

One embodiment is a method for detecting flow leakages in a transporting network for a liquid or gas. A measurement and control system is provisioned by measuring flow and direction at multiple times during a specified time range to determine a static state of the transporting network with no flow and a dynamic state of the transporting network with variable flow and variable direction. After provisioning, a first flow and first direction in the transporting network are measured, and then compared to measures in relevant static and dynamic states to determine if there is any leakage at all in the transporting network. If there any leakage, the system continues with multiple measures of a second flow and a second direction, and then process the data to determine if the rate of leakage is beyond a specific minimum rate, which would be considered "real leakage." If the rate of leakage is beyond the specific minimum rate, the system continues multiple measures of a third flow and a third direction to determine if the rate of leakage is beyond a certain maximum rate, which would be considered a "critical leakage." If the rate of leakage determined in the third flow is not beyond the maximum rate and hence not critical, report the rate of leakage to a communication unit. If the rate of leakage in the third flow is beyond the specific maximum rate, the system may immediately close the transporting network to bring flow to a rate of zero, and the rate of leakage is reported to the communication unit.

In one possible configuration of the method just described, further after provisioning, but before the measuring of a first flow and direction, the system empties the transporting network of flow before measuring the first flow and first direction.

In one possible configuration of the method just described, the emptying the transporting network of flow before measuring the first flow and direction includes closing the transporting network at one end; waiting for the system to empty out; opening the transporting network; and measuring the first flow and direction as the transporting network fills with liquid or gas.

In one possible configuration of the method just described with emptying the transporting network of flow, the measurement of the first flow and direction determines absence of a flow in the transporting network, which indicates that there is no leak in the transporting network, or at worst there is a small leak not requiring corrective action. The transporting network is therefore in normal operation 550, and the measurement and control system sends the measurements and results to a data base to enable a greater accuracy in the provisioned results of the transporting network. Improving accuracy in the system's knowledge of flow in the transporting network is system learning 510.

In one possible configuration of the method described above with emptying the transporting network of flow, the measurement of the first flow and first direction determines presence of a leak from the transporting network, and the measurement and control system processes the data derived from the measurement to determine 560 if the rate of the leak exceeds a specific minimum rate such that the leak is real. If the leak as described above is not real, the measurement and control system sends the measurements and results to a data base to enable a greater accuracy in the provisioned results of the transporting network. If the leak as described above is real, the system takes more measurements of the transporting network to determine if the rate of the leakage exceeds a specific maximum rate such that the rate of leakage is critical. If the rate of leakage just described is not critical, the system sends the measurements and results to the data base to enable a greater accuracy in the provisioned results of the transporting network. If the rate of leakage is critical, the system sends the measurements and results to the database to enable a greater accuracy in the provisioned results of the transporting network, the system reports the results to a communication unit, and system takes further action in accordance with a predefined protocol.

In one possible configuration of the method just described with a critical leak, the communication unit communicates the report of a critical leakage to a cloud, which sends immediate at least one report to one or more other devices. In alternative embodiments, reports may also be sent regarding leaks that are real but not critical, or leaks that are less than real, or situations in which there is no leak.

In one possible configuration of the method just described with a report for a critical leak, the other devices are consumer devices that enable human users to review the system and take corrective action. Non-limiting examples of such devices include a desktop computer, a portable computer, a cellular phone, and a land mobile telephone.

In one possible configuration of the method described with a report for a critical leak, the other devices are automated devices that automatically take actions. Such actions may include, for example, one or more of closing one or more parts of the transporting network, opening one or more parts of the transporting network, sending reports to human operators, and ordering a schedule for service. Multiple actions may be taken.

In one possible configuration of the method just described with automated devices, any or all of the actions may be taken in response to the data from the multiple measuring points in the transporting network. For example, some such actions may be from opening or closing two or more parts of the transporting network in response to such data.

One embodiment is a method for system learning of flow and direction of liquid or gas in a transporting network. A measurement and control system closes the input of a transporting network. The system waits a brief period of time, typically two to four seconds, but could be even less in a transporting system with rapid flow. The system opens the input of transporting network, then immediately measures the flow and direction of liquid or gas in the transporting network at a physical point of measurement. The system determines from the measurements of flow and direction when the transporting network is likely to be static without flow, and when it is likely to be dynamic with flow and direction.

In one possible configuration of the method for system learning just described, further the system measures flow and direction within the transporting network at multiple times over a period of days or weeks, and processes data derived from such measurements to determine the specific times when flow is negligible or zero.

In one possible configuration of the method just described for system learning with multiple measurements, the system receives additional reports of measurements of flow and direction in the transporting network, and uses such additional reports to determine the existence and severity of leakage in the transporting network.

One embodiment is a system for measuring flow in a transporting network containing a gas or liquid. There is a transporting network for gas or liquid, which includes at least one flow input valve. A flow detector for measuring flow rate and direction of the gas or liquid in the transporting network is attached to the network. The flow detector is positioned immediately upstream of the flow input valve. The system includes also a controller for receiving and processing measurement data from the flow detector to determine if there is a leakage or blockage in the transporting network, and if so, then determining the severity of the leakage or blockage.

In a possible configuration of the system just described, the system is further configured to detect patterns of flow over a period of time at a point of measurement, and is further configured to detect a deviation in the patterns.

In a first possible variation of the configuration just described, further one pattern is a relatively fixed flow over a period of time, and the deviation is a decrease of flow below an expected fixed flow according to the pattern, thereby indicating a possible leak of liquid or gas from the transporting network.

In a second possible variation of the configuration described above for detecting patterns of flow, further one pattern is a relatively fixed flow over a period of time, and the deviation is an increase of flow above an expected fixed on according to the pattern, thereby indicating a possible leak of liquid or gas from the transporting network.

In a third possible variation of the configuration described above for detecting patterns of flow, further one pattern is a relatively fixed flow over a period of time, and the deviation is a decrease of flow below an expected fixed flow according to the pattern, thereby indicating a possible blockage of the flow in the transporting network.

In a fourth possible variation of the configuration described above for detecting patterns of flow, further the system is configured to detect measure flow and detect patterns of flow at multiple points in the transporting network, and each point has its own pattern of flow such that a change in measured flow in the transporting network may be attributed to a specific point of measurement in the network. The system can identify which part of a transporting network is being used over a specific period of time.

One embodiment is a system for measuring pressure in a transporting network containing a gas or liquid. There is a transporting network for gas or liquid, which includes at least one flow input valve. A pressure detector for measuring pressure and direction of the gas or liquid in the transporting network is attached to the network. The pressure detector is positioned immediately upstream of the flow input valve. The system includes also a controller for receiving and processing measurement data from the pressure detector to determine the amount of gas or liquid that passes through a point of measurement at a given time.

In a possible configuration of the system just described, the system is further configured to detect patterns of pressure over time at a point of measurement, and is further configured to detect a deviation in the patterns.

In a first possible variation of the configuration just described, further one pattern is a relatively fixed pressure over a period of time, and the deviation is a decrease of pressure below an expected fixed pressure according to the pattern, thereby indicating a possible leak of liquid or gas from the transporting network.

In a second possible variation of the configuration described above for detecting patterns of flow over time, further one pattern is a relatively fixed flow over a period of time, and the deviation is an increase of flow above an expected fixed flow according to the pattern, thereby indicating a possible leak of liquid or gas from the transporting network.

In a third possible variation of the configuration described above for detecting patterns of pressure over time, further one pattern is a relatively fixed pressure over a period of time, and the deviation is a decrease of flow below an expected fixed flow according to the pattern, thereby indicating a possible blockage of the flow in the transporting network.

One embodiment is a system for measuring pressure in a transporting network containing a gas or liquid. There is a transporting network for gas or liquid, which includes at least one flow input valve. A flow detector for measuring flow rate and direction of the gas or liquid in the transporting network is attached to the network. The flow detector is positioned immediately upstream of the flow input valve. The system includes also a controller for receiving and processing measurement data from the flow detector to determine if there is a leakage or blockage in the transporting network, and if so, then determining the severity of the leakage or blockage.

In a possible configuration of the system just described, the system is further configured to detect patterns of flow over a period of time at a point of measurement, and is further configured to detect a deviation in the patterns.

In a possible variation of the possible configuration just described, the system is further configured to use multiple measurements over a period of time at a point of measurement to determine the quantity of gas or liquid passing that point of measurement during the period of time, and the system is further configured to calculate from such measurements the gas or water pressure at that point of measurement during the period of time. A flow processor processes the flow data over time to determine pressure and change of pressure at the point of measurement.

One embodiment is a method of measuring pressure in a transporting network using a flow sensor to determine the amount of gas or liquid that have been flowed in the network over a specific period of time. A system is provisioned placing the necessary sensors, processors, and communication units in the network. The system is prepared to accept data that allows the system to detect patterns of flow over time. A flow detector measures flow and change in flow at a point of measurement over a period of time. A flow processor processes flow data over time to determine pressure and changes in pressure at the point of measurement. A data processor calculates patterns of pressure over time at the point of measurement. A communication unit communicates the calculated patterns of pressure to the flow sensor.

In a possible configuration of the method just described, further the data processor detects patterns of pressure over a period time at the point of measurement and further detects a deviation in the patterns.

In a first possible variation of the possible configuration for patterns and deviations in patterns of pressure, further one pattern is a relatively fixed pressure over a period of time, the deviation is a decrease in measured pressure from the expected value, and the processor calculates the existence and severity of a leakage based on the decrease in pressure.

In a second possible variation of the possible configuration for patterns and deviations in patterns of pressure discussed above, further one pattern is a relatively fixed pressure over a period of time, the deviation is an increase in measured pressure from the expected value, and the processor calculates the existence and severity of a leakage based on the increase in pressure.

In a third possible variation of the possible configuration for patterns and deviations in patterns of pressure discussed above, further one pattern is a relatively fixed pressure over a period of time, the deviation is a decrease in measured pressure from the expected value, and the and the processor calculates the existence and severity of a blockage based on the decrease in pressure.

In a fourth possible variation of the possible configuration for patterns and deviations in patterns of pressure discussed above, further the system measures flow and detects patterns of pressure at multiple points in the transporting network, and each point has its own patterns of pressure such that a change in measured pressure in the transporting network may be attributed to a specific point of measurement in the network.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagram illustrates non-limiting embodiment/case example of the methods, and block diagrams illustrate non-limiting embodiment/case examples of the devices. Some operations in the flow diagram may be described with reference to the embodiments/cases illustrated by the block diagrams. However, the method of the flow diagram could be performed by embodiments/cases of the invention other than those discussed with reference to the block diagrams, and embodiments/cases discussed with reference to the block diagrams could perform operations different from those discussed with reference to the flow diagram. Moreover, although the flow diagram may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, a system may include multiple compute elements, each of which is communicatively connected to multiple servers, even though specific illustrations presented herein include only one compute element or a maximum of two compute elements.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A system for determining a leakage or blockage in a transporting network containing a gas or liquid, comprising:
   a transporting network for gas or liquid;
   a flow input valve;
   a flow detector for measuring flow rate and direction of the gas or liquid in the transporting network at a point of measurement, wherein the flow detector is positioned immediately upstream of the flow input valve; and a controller for receiving and processing measurement data from the flow detector to determine if there is a leakage or blockage in the transporting network, and if so, then determining the severity of the leakage or blockage.

2. The system of claim 1, wherein the system is further configured to detect patterns of flow over a period of time at the point of measurement, and is further configured to detect a deviation in the patterns.

3. The system of claim 2, wherein one pattern is a relatively fixed flow over a period of time, and the deviation is a decrease of flow below an expected fixed flow according to the pattern, thereby indicating a possible leak of liquid or gas from the transporting network.

4. The system of claim 2, wherein one pattern is a relatively fixed flow over a period of time, and the deviation is an increase of flow above an expected fixed on according to the pattern, thereby indicating a possible leak of liquid or gas from the transporting network.

5. The system of claim 2, wherein one pattern is a relatively fixed flow over a period of time, and the deviation is a decrease of flow below an expected fixed flow according to the pattern, thereby indicating a possible blockage of the flow in the transporting network.

6. The system of claim 2, wherein the system is configured to detect measure flow and detect patterns of flow at multiple points in the transporting network, and each point has its own pattern of flow such that a change in measured flow in the transporting network may be attributed to a specific point of measurement in the network.

7. A system for indicating a possible leakage of gas or liquid from a transporting network containing a gas or liquid, comprising:
a flow input valve;
a pressure detector for measuring pressure and direction of the gas or liquid in the transporting network, wherein the pressure detector is positioned immediately upstream of the flow input valve; and
a controller for receiving and processing measurement data from the pressure detector to measure pressure by determining the amount of gas or liquid that passes through a point of measurement at a given time,
wherein the controller is to detect patterns of pressure over time at the point of measurement, and is further to detect a deviation in the patterns, and
wherein the pattern is a relatively fixed pressure over a period of time, and the deviation is a decrease of pressure below an expected fixed flow according to the pattern, the controller indicates a possible leak of gas or liquid from the transporting network.

8. The system of claim 7, wherein one pattern is a relatively fixed pressure over a period of time, and the deviation is an increase of pressure above an expected fixed flow according to the pattern, thereby indicating a possible leak of gas or liquid from the transporting network.

9. The system of claim 7, wherein one pattern is a relatively fixed pressure over a period of time, and the deviation is a decrease of pressure below an expected fixed flow according to the pattern, thereby indicating a possible blockage of the flow in the transporting network.

10. A system for determining a leakage or blockage in a transporting network containing a gas or liquid, comprising:
a transporting network for gas or liquid;
a flow input valve;
a flow detector for measuring flow and direction of the gas or liquid in the transporting network, wherein the flow detector is positioned immediately upstream of the flow input valve; and
a controller for receiving and processing measurement data from the flow detector to determine if there is a leakage or blockage in the transporting network, and if so, then determining the severity of the leakage or blockage.

11. The system of claim 10, wherein the system is further configured to detect patterns of flow over a period of time at a point of measurement, and is further configured to detect a deviation in the patterns.

12. The system of claim 11, wherein the system is further configured to use multiple measurements over a period of time at a point of measurement to determine the quantity of gas or liquid passing that point of measurement during the period of time, and the system is further configured to calculate from such measurements the gas or water pressure at that point of measurement during the period of time.

13. A method of calculating existence and severity of a leakage in a transporting network by measuring pressure in the transporting network using a flow sensor which determines an amount of gas or liquid that has been flowed in the network over a specific period of time, comprising:
provisioning a system by placing necessary sensors, processors, and communication units, in the network;
preparing the system to accept data that allows the system to detect patterns of flow over time;
measuring flow and changes in flow at a point of measurement over a period of time, by a flow sensor;
processing flow data over time to determine pressure and changes in pressure at the point of measurement, by a flow processor;
calculating patterns of pressure over time at the point of measurement, by a data processor; and
communicating calculated patterns of pressure to the flow sensor, by a communication unit,
wherein the data processor further detects a deviation of the determined pressure from the calculated patterns, and
wherein the calculated pattern is a relatively fixed pressure over the period of time, the deviation is a decrease in measured pressure from the expected value, and the processor calculates the existence and severity of a leakage based on the decrease in pressure.

14. The method of claim 13, wherein the pattern is a relatively fixed pressure over a period of time, the deviation is an increase in measured pressure from the expected value, and the processor calculates the existence and severity of a leakage based on the increase in pressure.

15. The method of claim 13, wherein the pattern is a relatively fixed pressure over a period of time, the deviation is a decrease in measured pressure from the expected value, and the processor calculates the existence and severity of a blockage based on the decrease in pressure.

16. The method of claim 13, wherein the system measures flow and detects patterns of pressure at multiple points in the transporting network, and each point has its own patterns of pressure such that a change in measured pressure in the transporting network may be attributed to a specific point of measurement in the network.

* * * * *